(12) United States Patent
Abiko et al.

(10) Patent No.: US 8,416,658 B2
(45) Date of Patent: Apr. 9, 2013

(54) RECORDING APPARATUS AND RECORDING METHOD FOR DATA AND FILE SYSTEM INFORMATION

(75) Inventors: Ryo Abiko, Kanagawa (JP); Masakazu Murata, Kanagawa (JP)

(73) Assignee: Sony Corporation, Tokyo (JP)

( * ) Notice: Subject to any disclaimer, the term of this patent is extended or adjusted under 35 U.S.C. 154(b) by 877 days.

(21) Appl. No.: 12/012,176

(22) Filed: Jan. 31, 2008

(65) Prior Publication Data

US 2008/0186829 A1 Aug. 7, 2008

(30) Foreign Application Priority Data

Feb. 2, 2007 (JP) ................................. 2007-024680

(51) Int. Cl.
*G11B 7/00* (2006.01)
(52) U.S. Cl. .................................................... 369/47.13
(58) Field of Classification Search .................. None
See application file for complete search history.

(56) References Cited

U.S. PATENT DOCUMENTS

| | | | |
|---|---|---|---|
| 5,802,240 A | 9/1998 | Asai | |
| 2006/0179212 A1* | 8/2006 | Kim et al. | 711/103 |
| 2007/0008852 A1* | 1/2007 | Kobayashi | 369/53.2 |
| 2007/0058729 A1 | 3/2007 | Yoshinari | |
| 2007/0183272 A1* | 8/2007 | Yamada | 369/30.04 |
| 2008/0259751 A1* | 10/2008 | Nakamura et al. | 369/47.13 |

FOREIGN PATENT DOCUMENTS

| | | |
|---|---|---|
| JP | 9 18830 | 1/1997 |
| JP | 11 341436 | 12/1999 |
| JP | 2003 264773 | 9/2003 |
| JP | 2005-149638 | 6/2005 |
| JP | 2005 323386 | 11/2005 |

* cited by examiner

*Primary Examiner* — Joseph Haley
*Assistant Examiner* — Emily Frank
(74) *Attorney, Agent, or Firm* — Frommer Lawrence & Haug LLP; William S. Frommer; Ellen Marcie Emas

(57) ABSTRACT

Disclosed is a recording apparatus for recording data on a recording medium. The recording apparatus includes an assigning section for assigning a region that is part of a block utilized for a recording unit of the recording medium as a file system information region utilized as a region for file system information for managing the data on the recording medium. The recording apparatus further includes a recording section operable to record file system information for data that has been recorded in all blocks in the file system information region of each block until the file system information region in a block is filled and to record file system information for data in all blocks subsequent to the block having the filled file system information region in the file system information region of each subsequent block after the file system information region in a block has been filled.

7 Claims, 16 Drawing Sheets

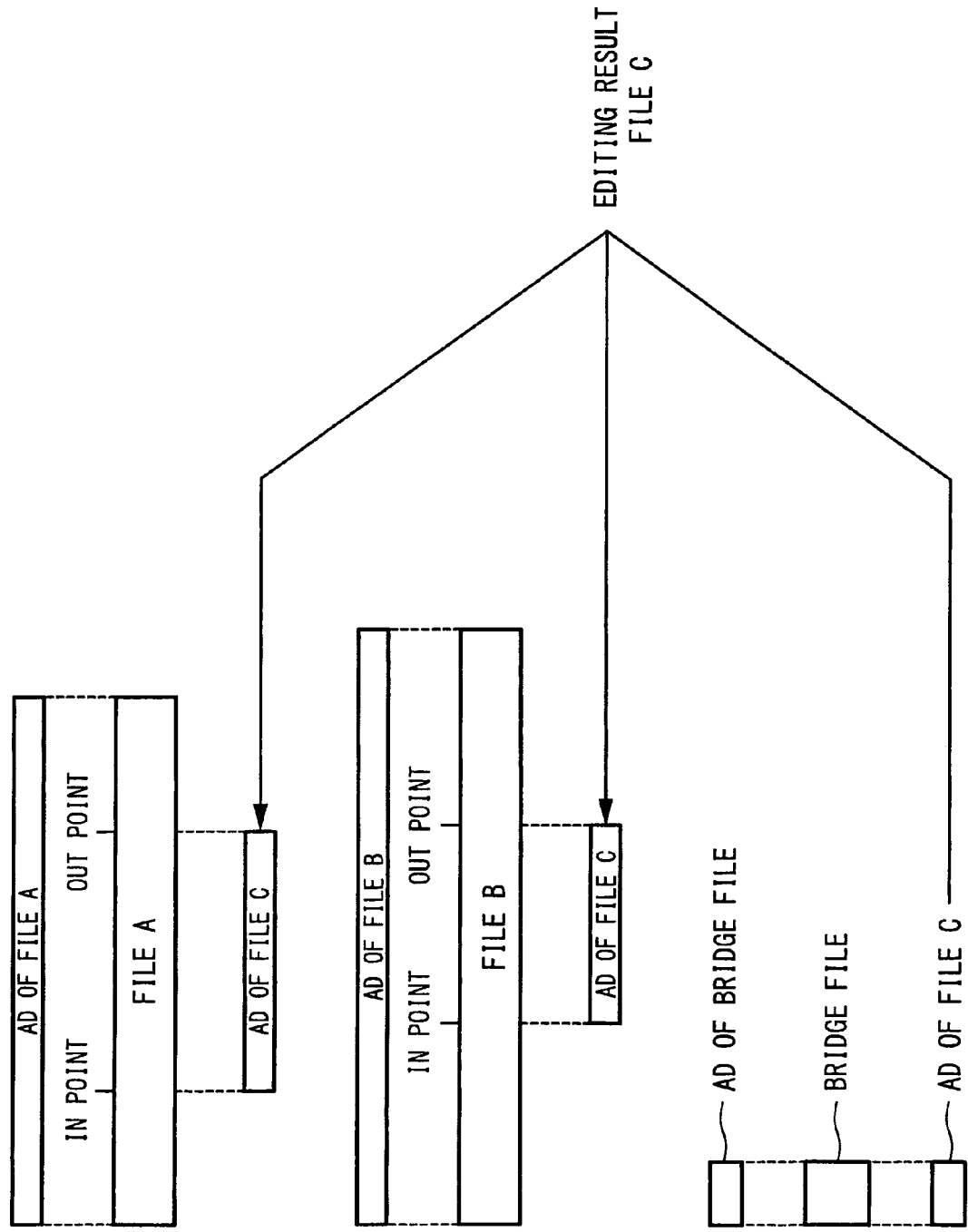

FIG. 7
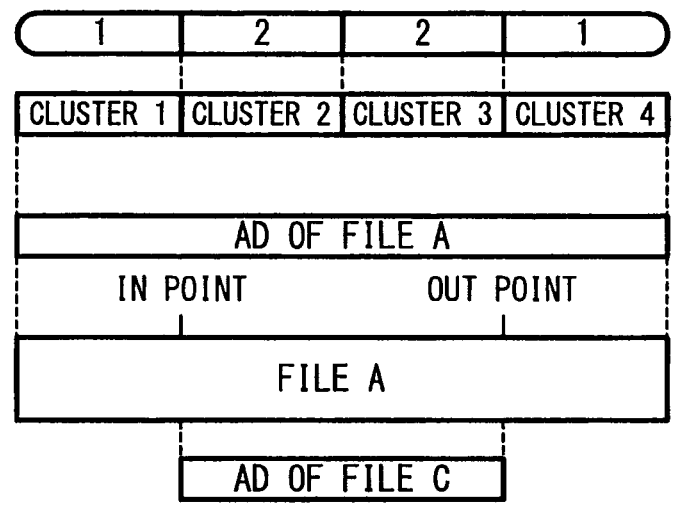
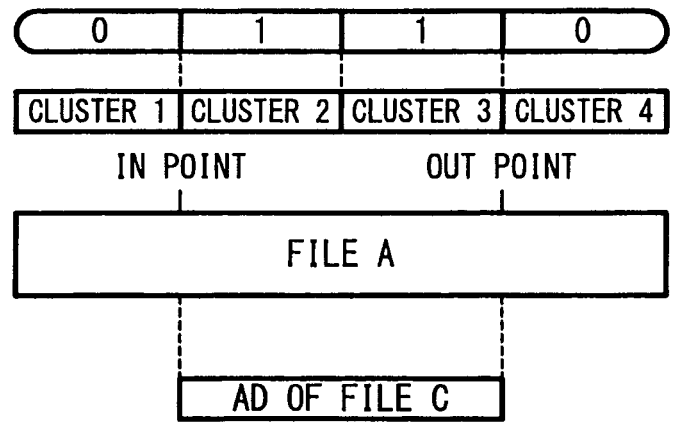

RECORDING APPARATUS AND RECORDING METHOD FOR DATA AND FILE SYSTEM INFORMATION

CROSS REFERENCES TO RELATED APPLICATIONS

The present invention contains subject matter related to Japanese Patent Application JP 2007-024680 filed in the Japanese Patent Office on Feb. 2, 2007, the entire contents of which being incorporated herein by reference.

BACKGROUND OF THE INVENTION

1. Field of the Invention

The present invention relates to an apparatus and method for recording data and file system information for managing such data.

2. Description of the Related Art

When data is recorded as a file in a recording apparatus, it is customary to generate file system information containing information indicating the recording position of the data inside the recording apparatus and the like and to thereafter manage the recorded data using the file system information.

The related art method of recording the generated file system information records the file system information on the same recording medium as the data but in a different block (i.e., a region used as a recording unit) to the block in which the data is recorded (e.g., Japanese Unexamined Patent Application Publication No. 2005-149638 (Paragraphs 0124 to 0130)).

However, when this method is used for a recording apparatus where high access performance (i.e., a high bit rate for recording and playing back data) is required, such as a video server used to record and play back AV (audio/video) data at a TV channel, the recording medium will be frequently accessed just to record the file system information, thereby lowering the available bit rate for recording and playing back data. Thus, to maintain the bit rate for recording and playing back data, it is preferable to lower the frequency with which the file system information is generated or updated and/or to lower the priority of writes of the file system information onto the recording medium and record/update the file system information in only a cache memory. However, it may not be possible to properly manage the recorded data.

There is also a method where the recording/playback bit rate for data is maintained by recording the file system information on a different recording medium to the recording medium on which the data is recorded.

However, with such method, even if there is free space available on the recording medium used for recording data, the recording of data will have to be stopped if there is no more free space on the recording medium used to record the file system information. To avoid such situation, it is preferable to provide extra capacity on the recording medium used for the file system information, which means that a large-capacity recording medium has to be provided in addition to the recording medium used to record the data.

SUMMARY OF THE INVENTION

The present invention attempts to address the recording of file system information used to manage data on the same recording medium as the data while maintaining the recording/playback bit rate of the data and without lowering the priority of the file system information.

A recording apparatus for recording data on a recording medium according to an embodiment of the present invention includes an assigning section for assigning a region that is part of each block utilized for a recording unit of the recording medium as a file system information region utilized for a region for file system information for managing the data on the recording medium, and a recording section operable to record file system information for data that has been recorded in all blocks in the file system information region of each block until the file system information region in a block is filled, and operable to record file system information for data in all blocks subsequent to the block having the filled file system information region in the file system information region of each subsequent block after the file system information region in a block has been filled.

A method for recording data on a recording medium according to an embodiment of the present invention includes an assigning step for assigning a region that is part of each block utilized for a recording unit of the recording medium as a file system information region utilized for a region for file system information for managing the data on the recording medium, and a recording step recording file system information for data that has been recorded in all blocks in the file system information region of each block until the file system information region in a block is filled, and recording file system information for data in all blocks subsequent to the block having the filled file system information region in the file system information region of each subsequent block after the file system information region in the block has been filled.

According to the recording apparatus and the recording medium, since file system information is simultaneously recorded in the same block while data is recorded without the recording medium being accessed only to record file system information, it is possible to record the file system information that is frequently updated with small amounts of updated data while maintaining the access performance (i.e., the bit rate for recording and playing back data) of the recording medium.

According to the recording apparatus and the recording medium, since file system information is simultaneously recorded in the same block while data is recorded without the recording medium being accessed only to record file system information, it is possible to record the file system information that is frequently updated with small amounts of updated data while maintaining the bit rate for recording and playing back data) of the recording medium.

BRIEF DESCRIPTION OF THE DRAWINGS

FIG. 4 is a diagram showing one example of how an editing result file is generated by the processing in FIG. 2;

FIG. 7 is a diagram showing how a source file is deleted;

DESCRIPTION OF THE PREFERRED EMBODIMENTS

Figure 1:
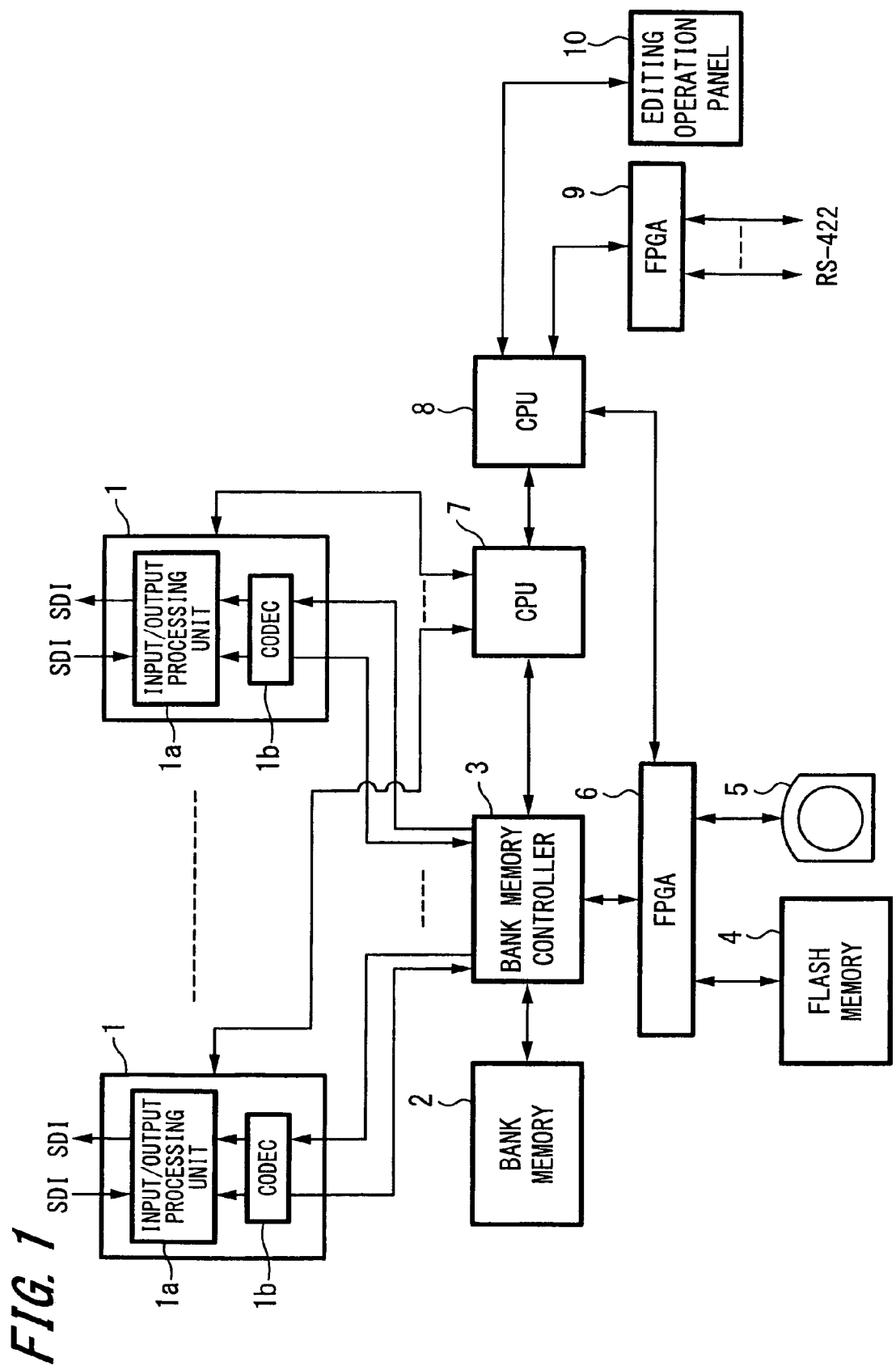
FIG. 1 is a diagram showing one example of the overall construction of a video server to which an embodiment of the present invention has been applied.

An example where the present invention is applied to a video server for television broadcasts will now be described in detail with reference to the attached drawings as an embodiment of the present invention.
Video Server First, the overall construction of a video server to which an embodiment of the present invention has been applied will be described with reference to FIG. 1. This video server is constructed of the following elements:

- a plurality of (for example, five) SDI input/output ports 1 that input and output serial digital signals according to SDI standard;
- a bank memory 2 for temporarily recording AV data;
- a bank memory controller 3 for reading and writing AV data from and into the bank memory 2;
- a large-capacity flash memory 4 and an optical disc drive 5 as main storage;
- an FPGA 6 equipped with a low-performance processor for controlling the flash memory 4 and the optical disc drive 5;
- a CPU 7 that controls the SDI input/output ports 1 and the bank memory controller 3;
- a CPU 8 that controls the entire video server and stores file systems for managing AV data in the flash memory 4 and the optical disc drive 5 respectively and a file manager, which is a higher-level program than such file systems;
- an FPGA 9 that is equipped with a low-performance processor, sends record/playback commands for each SDI input/output port 1 that have been received from the periphery according to RS-422 protocol to the CPU 8, converts a status received from the CPU 8 to RS-422 protocol, and sends the converted status to the periphery as a reply; and
- an editing operation panel 10 for carry out editing operations, such as a cut edit, on the AV data recorded in the flash memory 4 and/or the optical disc drive 5.

When a record command for any of the SDI input/output ports 1 is received by the FPGA 9, the CPU 8 and the CPU 7 carry out control so that a serial data signal according to SDI standard inputted into the SDI input/output port 1 in question is converted to parallel AV data by an input/output processing unit 1a, is encoded (i.e., compressed) using Long GOP by a codec 1b, and is then sent to the bank memory controller 3, which writes each frame in the encoded data into the bank memory 2.

According to control by the CPU 8 and the CPU 7, whenever a predetermined amount of AV data from the SDI input/output port 1 has been written, such AV data is read from the bank memory 2 by the bank memory controller 3 and is recorded as a file via the FPGA 6 into the flash memory 4 or the optical disc drive 5 (i.e., whichever of the flash memory 4 and the optical disc drive 5 is designated by a record command).

Also according to control by the CPU 8 and the CPU 7, when a playback command for any of the SDI input/output ports 1 is received by the FPGA 9, AV data is read from the flash memory 4 or the optical disc drive 5 (i.e., whichever of the flash memory 4 and the optical disc drive 5 is designated by the playback command) and is written via the FPGA 6 into the bank memory 2 by the bank memory controller 3.

Figure 3A:
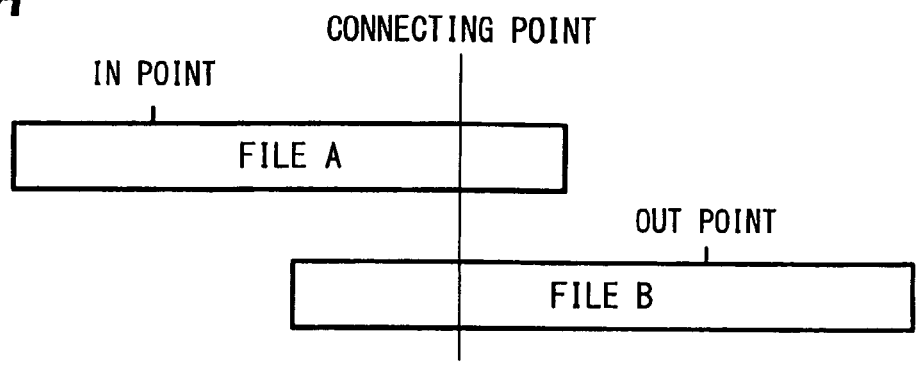
FIGS. 3A to 3C are diagrams showing an example of how an editing result file is generated by the processing in FIG. 2.

Each frame of AV data is read out from the bank memory 2 by the bank memory controller 3 and sent to the SDI input/output port 1 in question. In the SDI input/output port 1, the AV data is decoded (i.e., decompressed) using Long GOP using the codec 1b and the data is then converted to a serial data signal according to SDI standard by the input/output processing unit 1a and outputted.
Cut Edit Processing for Files in Main Storage An example of cut edit processing carried out on a file in main storage by this video server will now be described. By using the editing operation panel 10, the user can carry out a cut edit operation via a GUI screen while viewing proxy data (i.e., video data of a low resolution used for editing operations) of the AV data recorded in the flash memory 4 and/or the optical disc drive 5 that is outputted from one of the SDI input/output ports 1 on a monitor (or alternatively the display of the editing operation panel 10 itself which is connected via an HDMI (High-Definition Multimedia Interface) or the like to the SDI input/output port 1). During a cut edit operation, as shown in FIG. 3A, to carry out a cut on source files (i.e., files to be edited) A and B, it is possible to designate an IN point for file A, a connecting point for file A and file B (a frame within a GOP may be used), and an OUT point for file B. It is also possible to designate the deletion of the source files A and B as necessary.

Figure 2:
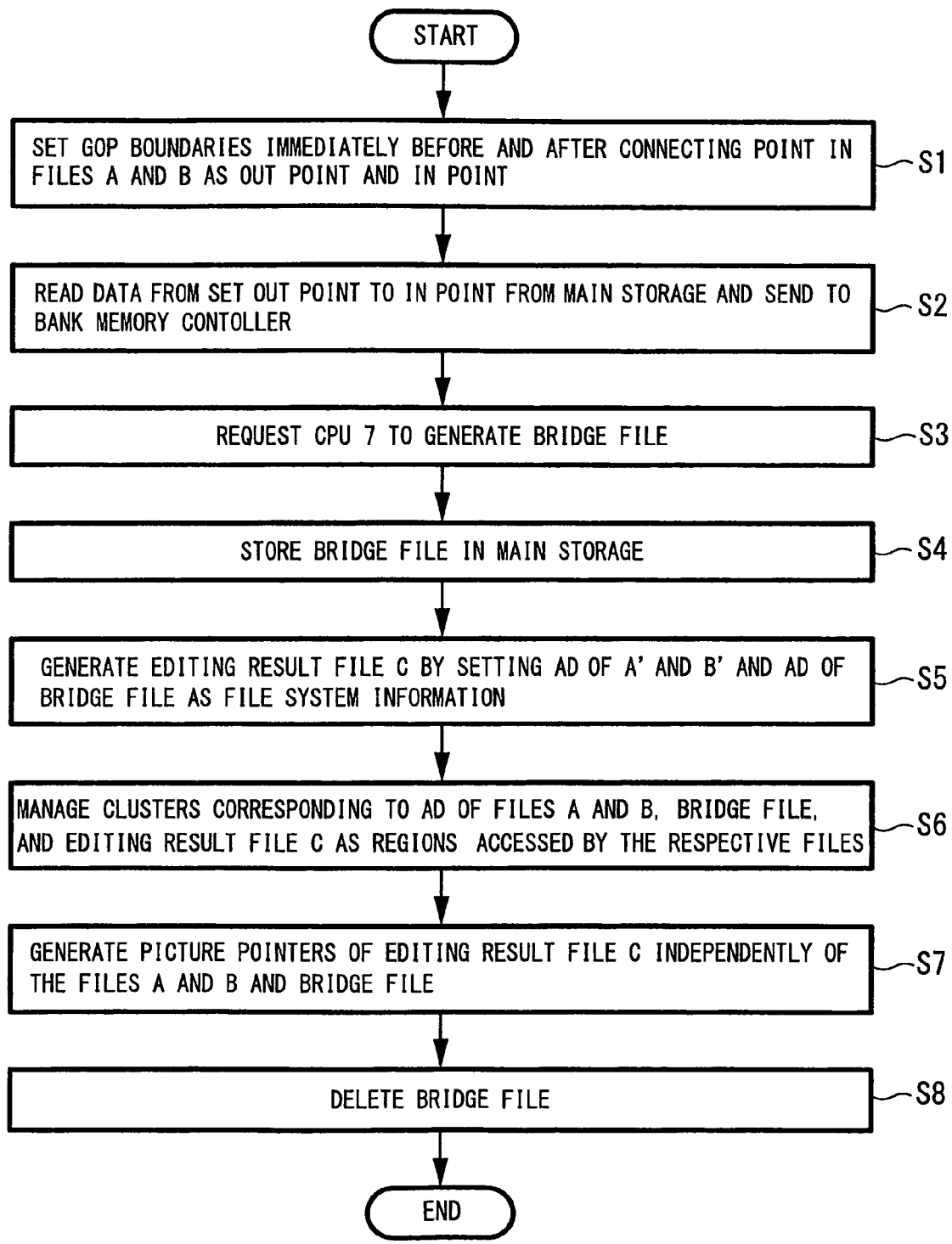
FIG. 2 is a flowchart showing cut edit processing.

When information on a cut edit operation performed on the editing operation panel 10 is sent to the CPU 8, the CPU 8 carries out cut edit processing such as that shown in FIG. 2 as processing executed via the file systems and file manager mentioned above.

Figure 3B:
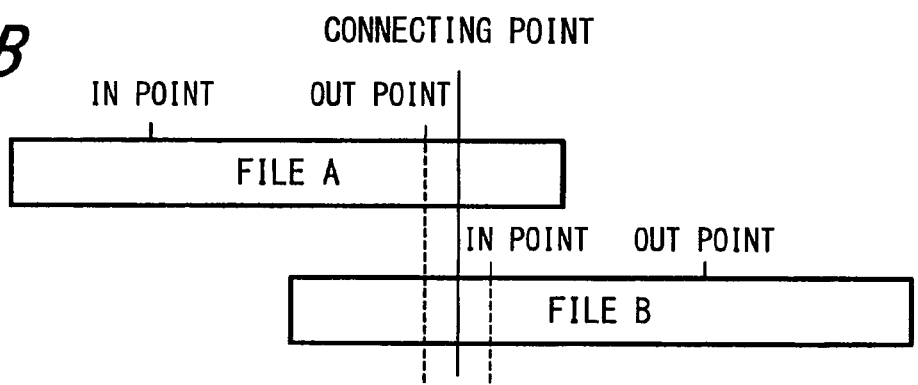

First, of the two source files (here also designated as A and B), a frame at a GOP boundary immediately before the connecting point in file A is determined as an OUT point and a frame at a GOP boundary immediately after the connecting point in file B is determined as an IN point (step S1). FIG. 3B shows how the processing in step S1 is carried out on the operation content in FIG. 3A.

After step S1, frames from the OUT point in file A (i.e., the OUT point set in step S1) to the connecting point and frames from the connecting point in file B to the IN point (the IN point set in step S1) are read from the main storage (i.e., whichever of the flash memory 4 and the optical disc drive in which files A and B are recorded) and sent to the bank memory controller 3 (see FIG. 1) via the FPGA 6 (step S2).

Next, a command that requests generation of a bridge file, which is a file that connects the OUT point of file A and the IN point of file B, is sent to the CPU 7 (see FIG. 1) (step S3).

On receiving this command, the CPU 7 re-encodes the frames in file A from the OUT point to the connecting point and the frames in file B from the connecting point to the IN point that have been sent to the bank memory controller 3 without overloading a VBV buffer according to MPEG standard (i.e., a virtual buffer that corresponds to the input buffer of a decoding apparatus) to generate a bridge file.

Since the bridge file is generated from the files in no more than one GOP in each of files A and B, the data size of the bridge file will be very small regardless of the data size of the frames in file A from the IN point to the connecting point and the frames in file B from the connecting point to the OUT point designated by the cut edit operation. The CPU 7 sends the generated bridge file from the bank memory controller 3 via the FPGA 6 to the main storage in question.

Figure 3C:

After step S3, when the bridge file is sent to the main storage in question, the CPU 8 records the bridge file in the free space of the main storage (step S4). FIG. 3C shows how the processing in step S4 is carried out corresponding to FIGS. 3A and 3B.

After step S4, an editing result file (hereinafter also referred to as "file C") that sets location information (called AD (Allocation Descriptors)) indicating the recording positions (in the main storage) of a part from the IN point to the OUT point of file A (such part is referred to as "A'"), the recording positions of a part from the IN point to the OUT point of file B (such part is referred to as "B'"), and the recording positions of the entire bridge file as file system information is generated (step S5).

FIG. 4 shows the processing in step S5 corresponding to FIGS. 3A to 3C. Note that the AD for file A, file B, and the bridge file are generated as file system information when recording file A, file B, and the bridge file (which means in step S4 for the bridge file).

After step S5, cluster management information is generated (step S6). Clusters are units for the recording regions of the main storage managed by the file system, and of such clusters, the cluster management information manages clusters that correspond to the AD of file A, the AD of file B, and the AD of the bridge file as regions accessed by file A, file B, and the bridge file and manages the clusters corresponding to the AD of the editing result file C as regions accessed by the editing result file C. The generated cluster management information is stored in a memory inside the CPU 8.

More specifically, when file A, file B, and the bridge file are recorded, the number of accesses to clusters corresponding to the AD of file A, the AD of file B, and the AD of the bridge file are set at "1" to indicate that such clusters are accessed by file A, file B, and the bridge file. In step S6, of such clusters, the number of accesses to the clusters corresponding to the AD of the editing result file C is incremented to "2" as clusters that are also accessed by the editing result file. Information on the number of accesses to a cluster is set as "cluster management information".

Figure 5:
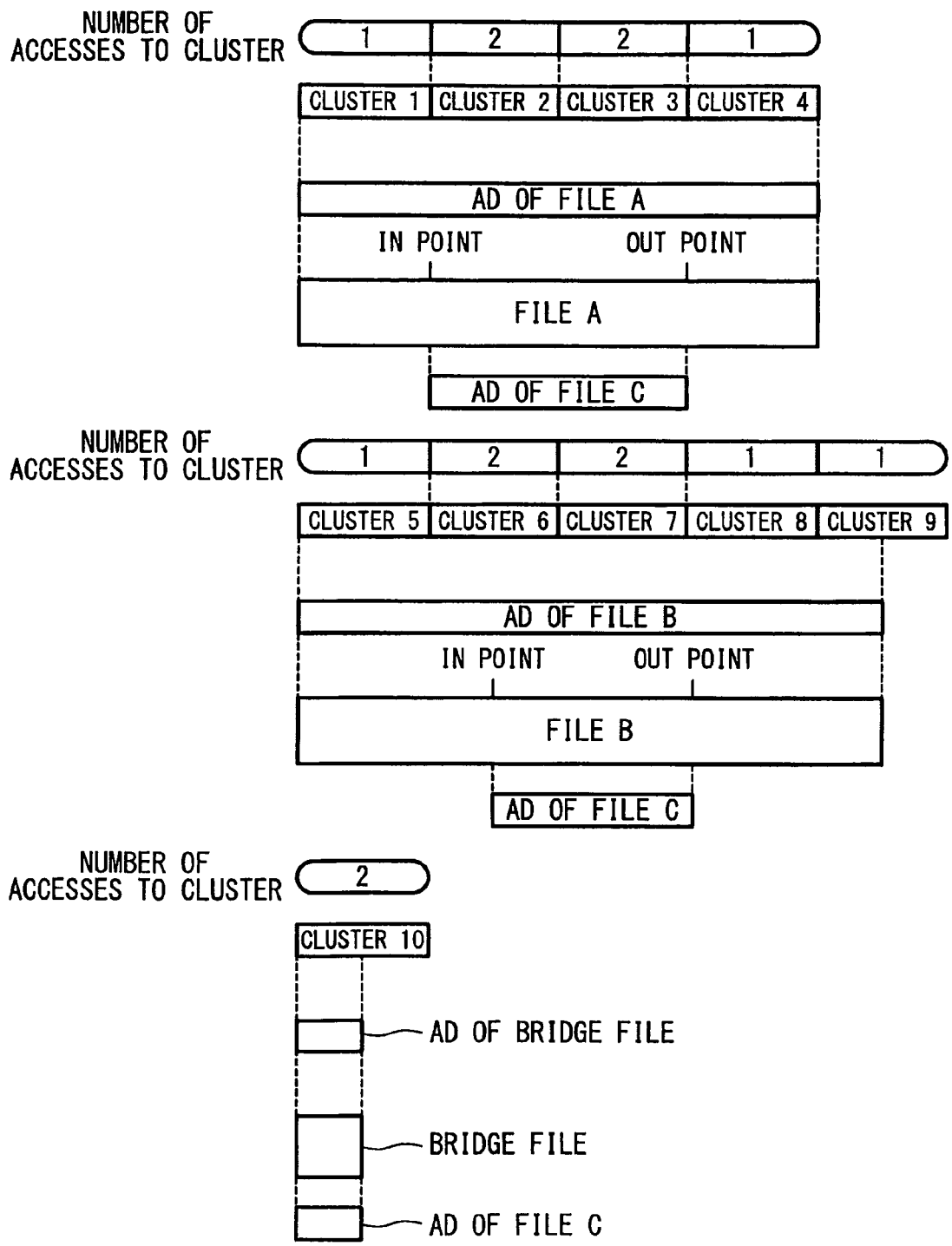
FIG. 5 is a diagram showing an example of how the number of accesses to a cluster is managed by the processing in FIG. 2.

FIG. 5 shows the processing in step S6 corresponding to FIGS. 3A to 3C and FIG. 4. Of the clusters with the cluster numbers 1 to 4 corresponding to the AD of file A, the number of accesses to the clusters with the cluster numbers 2 and 3 corresponding to the AD of the editing result file C is "2" and the number of accesses to the remaining clusters with the cluster numbers 1 and 4 is "1". Similarly, of the clusters with the cluster numbers 5 to 9 corresponding to the AD of file B, the number of accesses to the clusters with the cluster numbers 6 and 7 corresponding to the AD of the editing result file C is "2" and the number of accesses to the remaining clusters with the cluster numbers 5, 8 and 9 is "1". Since the cluster with the cluster number 10 corresponding to the AD of the bridge file also corresponds to the AD of the editing result file C, the number of accesses is "2".

As shown in FIGS. 3A to 3C, after step S6, index information (referred to as "picture pointers") including address information and size information for each frame of the editing result file C is generated independently of the picture pointers of files A and B (step S7).

Since the size of one frame in AV data encoded using Long GOP is not constant and varies, picture pointers are may be required to access arbitrary frames at high speed and are generated when recording files A and B.

Figure 6:
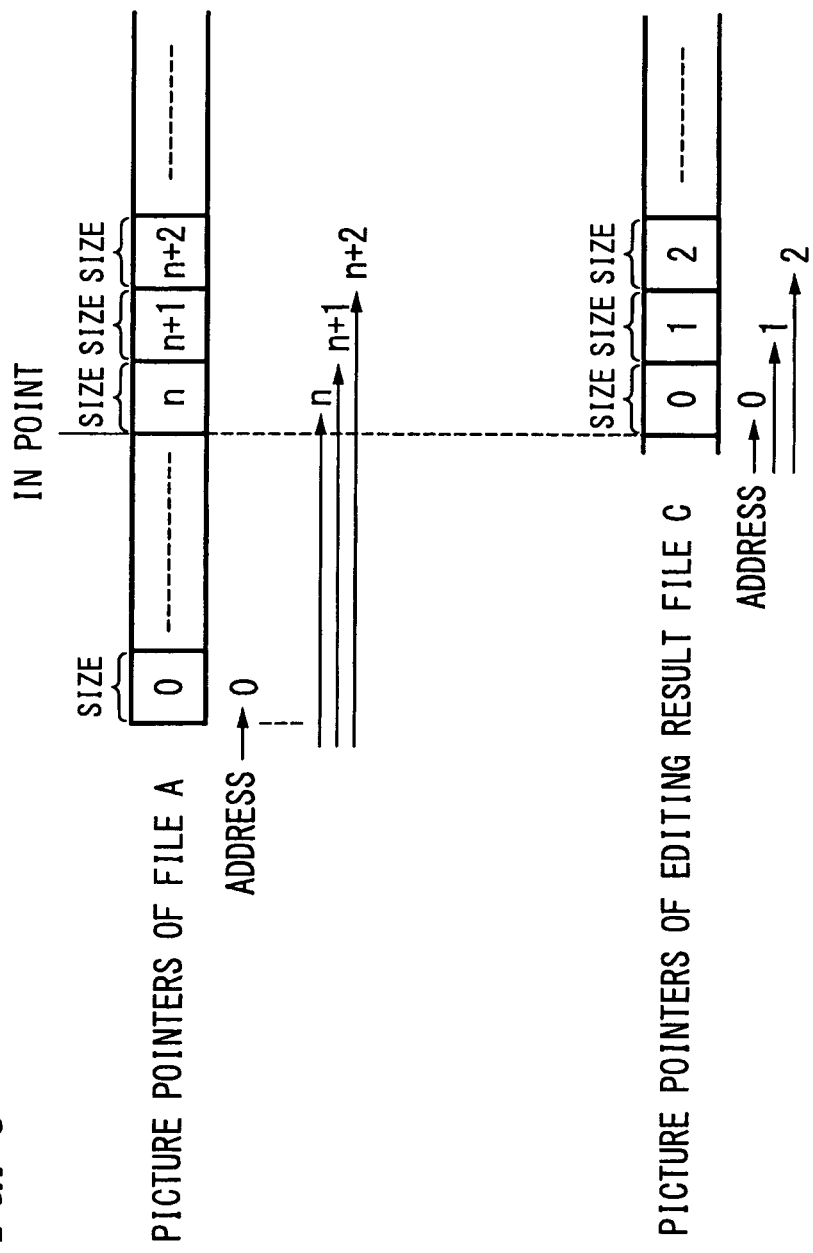
FIG. 6 is a diagram showing how picture pointers of an editing result file are generated by the processing in FIG. 2.

FIG. 6 is a diagram showing how picture pointers of the editing result file C are generated in step S7 compared to the picture pointers of file A. Since the picture pointers are assigned addresses from the start of the file, the addresses of the frames from the IN point onwards in the picture pointer of file A are n, n+1, n+2, . . . (where n is an integer of one or higher). On the other hand, in the editing result file C that starts at the IN point of file A, the addresses of the frames from the same IN point onwards are 0, 1, 2, . . . . The size information is the same as for the frames from the IN point to the OUT point of the file A, each frame of the bridge file, and the files from the IN point to the OUT point of the file B.

As shown in FIG. 2, after step S7, the bridge file is deleted (step S8). Note that with the file system stored in the CPU 8, processing of deleting a file is carried out in the file system by merely decrementing the number of accesses (see FIG. 5) to the clusters corresponding to the file AD to be deleted by one, so that the AV data itself is not deleted from the main storage. Accordingly, the deletion of the bridge file in step S8 is also carried out by merely decrementing the number of accesses to the cluster with the cluster number corresponding to the AD of the bridge file (the cluster with the cluster number 10 in FIG. 5) to "1". When step S8 ends, the cut edit processing is completed.

By carrying out the cut edit processing described above, when the video server carries out a cut edit of AV data files that have been encoded using Long GOP, only a bridge file that connects source files together and has a small data size is newly generated and recorded in the main storage (i.e., the flash memory 4 or the optical disc drive 5). Accordingly, the source files themselves are not copied (relocated) within the main storage and instead information indicating the recording positions of the parts used for editing (the frames from the IN points to the OUT points of files A, B respectively) is used to generate an editing result file.

Thus, it is possible to edit AV data encoded using Long GOP without copying the large amount of data in the source files, thereby minimize the use of space in the main storage and to reduce the time consumed with editing.

Of the clusters that are units of the recording regions, the clusters accessed by the source files and the clusters accessed by the editing result file are separately managed in the main storage, it is possible to treat the source files and the editing result file separately without distinguishing between them. Thus, it is possible to delete the source files.

Since the address information and size information (i.e., picture pointers) of which frames the recording positions are shown by the editing result file are generated independently of the picture pointers of the source files, it will be possible, even after the picture pointers of the source files have been deleted in the file system by deleting the source files, to access and play back arbitrary frames in the editing result file at high speed based on the picture pointers of the editing result file.

FIG. 7 shows how the source file A is deleted based on an operation made via the editing operation panel 10 and corresponds to FIG. 5. Of the clusters with the cluster numbers 1 to 4 corresponding to the AD of file A, the number of accesses to the cluster numbers 2 and 3 that also correspond to the AD of the editing result file C is decremented to "1" and the number of accesses to the remaining cluster numbers 1 and 4 are decremented to "0". The clusters with the cluster numbers 1 and 4, of which respective numbers of accesses are "0", are freed as unused regions and such regions can thereafter be used as regions for recording new AV data files. On the other hand, since the number of accesses is "1" for the clusters with the cluster numbers 2 and 3 corresponding to the AD of the editing result file C, the original recorded content is protected and no new AV data files will be recorded therein.

Recording Processing for File System Information of the Source Files and Bridge File Next, two examples of recording processing for the file system information of the source files and a bridge file (i.e., the AD of the source files A, B and the bridge file shown in FIG. 4) by the video server in FIG. 1 will be described.

FIRST EXAMPLE

Figure 8:
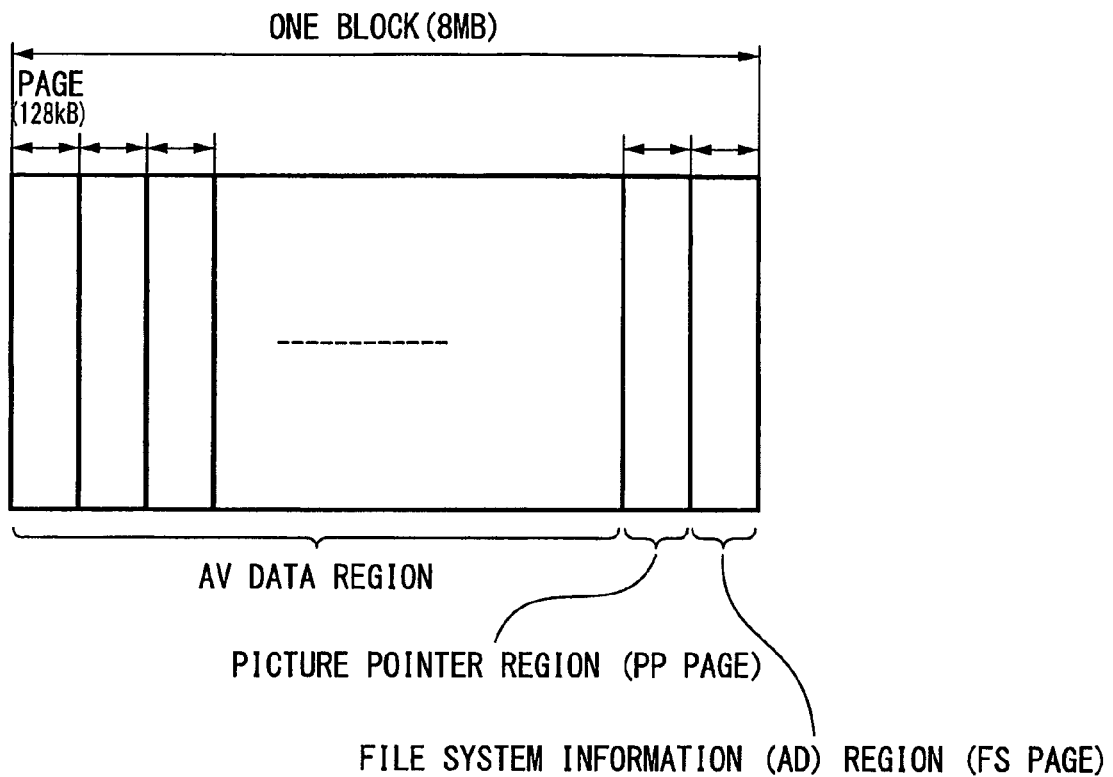
FIG. 8 is a diagram showing one example of how recording regions for file system information are assigned when recording source files and a bridge file in the flash memory shown in FIG. 1.

First, a first example will be described. When the CPU 8 (see FIG. 1) records source files and the bridge file in the flash memory 4, an 8 MB block including 64 pages (where one page is 128 KB) is set as a cluster, i.e., the unit for the recording regions. Next, as shown in FIG. 8, in each block, one page is assigned as an FS page that is a region for file system information (AD) and one page is assigned as a PP page that is a region for the picture pointers described above (i.e., address information and size information of each frame).

Since the data sizes of the AD and the picture pointers for one block of AV data are extremely small compared to the size of one page, it is possible to record the AD and the picture pointers for a plurality of blocks of AV data in one FS page and one PP page, respectively.

Figure 9:
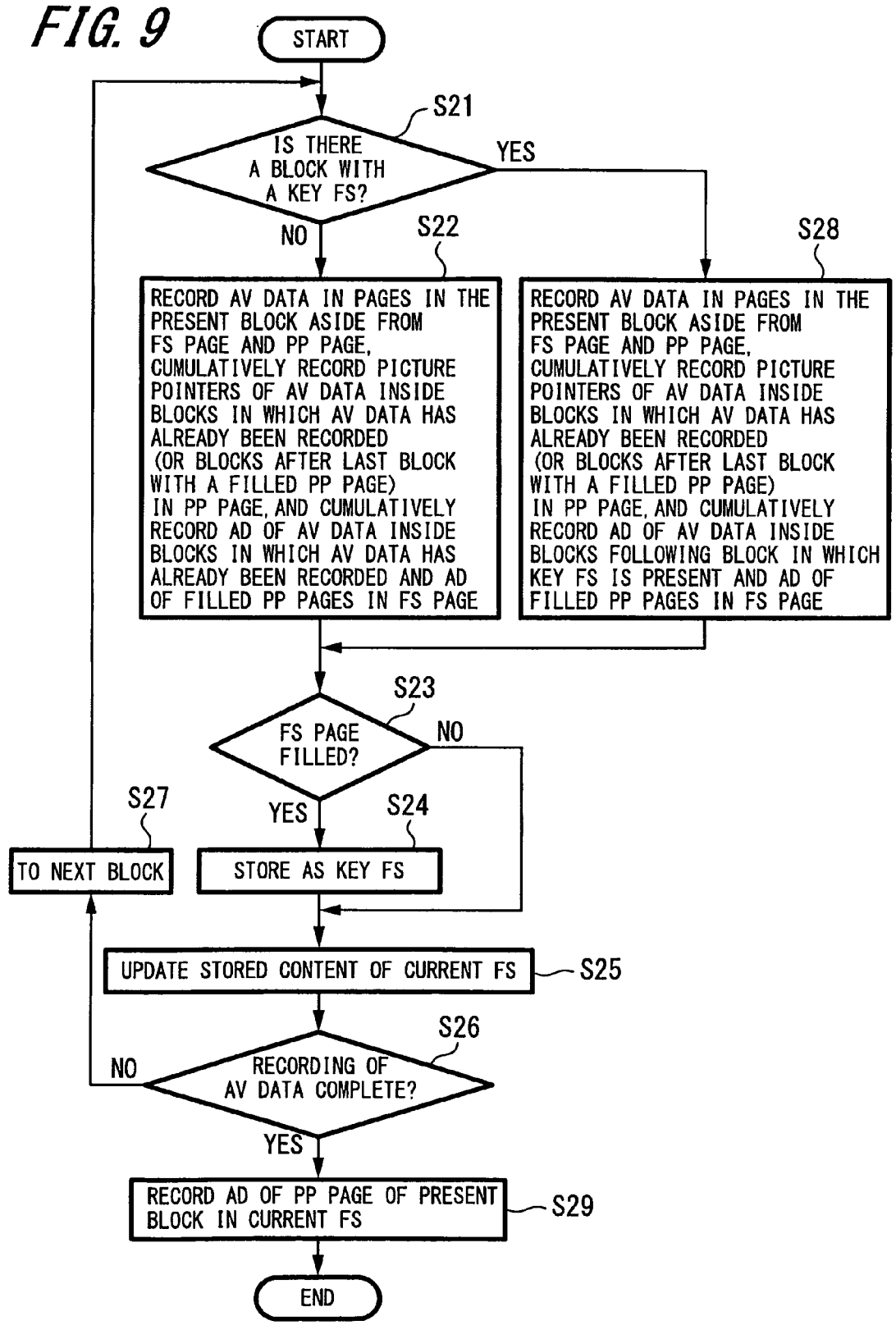
FIG. 9 is a flowchart showing one example of recording processing for AV data and file system information of source files and a bridge file.

When recording AV data of the source files and the bridge file, the CPU 8 carries out recording processing for AV data and file system information such as that shown in FIG. 9 using the file system and file manager described earlier.

In this processing, first, before AV data is recorded in the present block, it is determined whether AV data has already been recorded in a block that includes a key FS, as described later (step S21).

If the outcome is "no", AV data is recorded in pages in the present block other than the FS page and the PP page, and picture pointers of the AV data inside the blocks (including the present block) in which AV data has already been recorded (in a case where one or more PP pages that have been filled by recording 128 KB of picture pointers are present, the picture pointers of AV data inside blocks following the last filled PP page) are cumulatively recorded in the PP page. The AD of AV data inside blocks (including the present block) in which AV data has already been recorded and the AD of filled PP pages are then cumulatively recorded in the FS page (step S22).

Next, it is determined whether the FS page of the present block has been filled (i.e., whether 128 KB of AD and picture pointers have been recorded) (step S23).

If the outcome is "no", in the memory inside the CPU 8, the storage content of the current FS address that shows the latest FS page is updated to the address of the FS page of the present block (step S25). On the other hand, if the outcome is "yes", the address of the FS page of the present block is stored in the memory inside the CPU 8 as a key FS address (step S24, and the processing proceeds to step S25.

Next, it is determined whether the recording of AV data is complete (step S26). If the outcome is "no", the processing proceeds to the next block to be recorded (step S27) and returns to step S21.

If the outcome is "yes" in step S21, AV data is recorded in pages in the present block other than the FS page and the PP page, and picture pointers of the AV data inside the blocks (including the present block) in which AV data has already been recorded (or in a case where one or more filled PP pages is already present, the picture pointers of AV data inside blocks following the last filled PP page) are cumulatively recorded in the PP page. Then, the AD of AV data inside blocks (including the present FS block) following the block that includes the key FS and the AD of filled PP pages are cumulatively recorded in the FS page (step S28), before the processing returns to step S23.

If the outcome in step S26 is "yes", the AD of the PP page of the present block is also recorded in the FS page set as the current FS (step S29) and the processing is completed.

Figure 10:
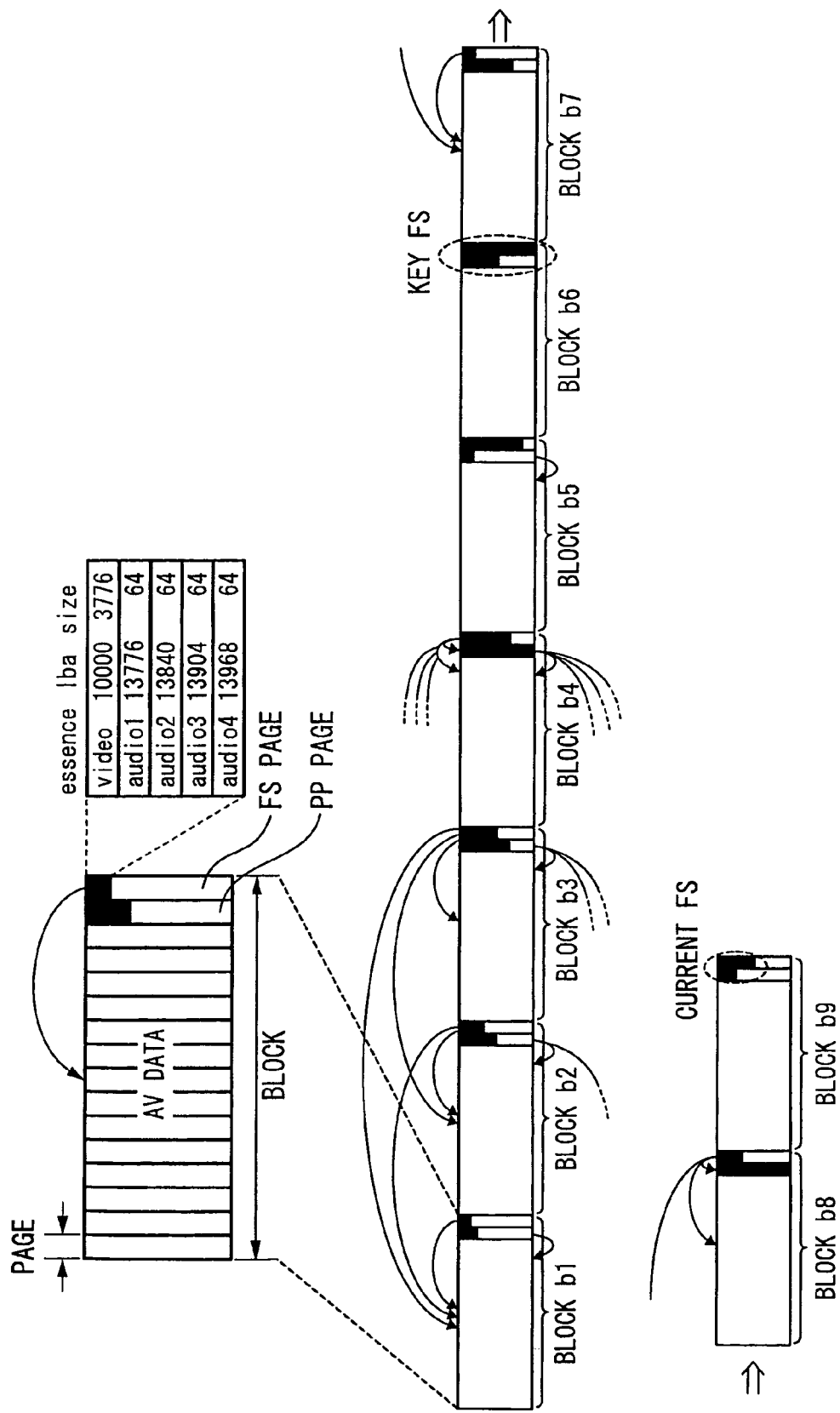
FIG. 10 is a diagram showing one example of how AV data and file system information of source files and a bridge file are recorded.

FIG. 10 is a diagram showing how AV data and file system information are recorded by the processing in FIG. 9. In the first block b1, AV data is recorded, picture pointers of the AV data inside the block b1 are recorded in the PP page, and AD (a start address and size of each "essence" including video and four channels of audio) of the AV data inside the block b1 are stored in the FS page (step S22 in FIG. 9).

In the following block b2, AV data is recorded, the picture pointers of the AV data inside blocks b1 and b2 are recorded in the PP page, and the AD of the AV data inside the blocks b1 and b2 are recorded in the FS page (step S22 in FIG. 9). In the following block b3, AV data is recorded, the picture pointers of the AV data inside blocks b1 to b3 are recorded in the PP page, and the AD of the AV data inside the blocks b1 to b3 are stored in the FS page (step S22 in FIG. 9).

In the next block b4, AV data is recorded and the picture pointers of the AV data inside blocks b1 to b4 are recorded in the PP page. Since the PP page has been filled, the AD of the AV data inside the blocks b1 to b4 and the AD of the PP page inside the block b4 are stored in the FS page (step S22 in FIG. 9).

In the following block b5, AV data is recorded, the picture pointers of the AV data inside the block b5 are recorded in the PP page, and the AD of the AV data inside the blocks b1 to b5 and the AD of the PP page inside the block b4 are stored in the FS page (step S22 in FIG. 9). Note that some of the arrows that show the correspondence between the PP pages and/or FS pages and the blocks have been omitted for the blocks from block b5 onwards.

In the following block b6, AV data is recorded, the picture pointers of the AV data inside the blocks b5 and b6 are recorded in the PP page, and the AD of the AV data inside the blocks b1 to b6 and the AD of the PP page inside the block b4 are recorded in the FS page (step S22 in FIG. 9), so that the FS page becomes full and is set as a key FS (step S24 in FIG. 9).

In the following block b7, AV data is recorded, the picture pointers of the AV data inside blocks b5 to b7 are recorded in the PP page, and the AD of the AV data inside the block b7 are recorded in the FS page (step S28 in FIG. 9).

In the following block b8, AV data is recorded and the picture pointers of the AV data inside the blocks b5 to b8 are recorded in the PP page. Since the PP page has been filled, the AD of the AV data inside the blocks b7 and b8 and the AD of the PP page inside the block b8 are stored in the FS page (step S28 in FIG. 9).

In the following block b9, AV data is recorded, the picture pointers of the AV data inside the block b9 are recorded in the PP page, and the AD of the AV data inside the blocks b7 to b9 and the AD of the PP page inside the block b8 are recorded in the FS page (step S28 in FIG. 9). After this, since the recording of AV data is completed at the block b9, the AD of the PP page inside the block b9 is also recorded in the FS page of the block b9 that has been set as the current FS (step S29 in FIG. 9).

According to this recording processing, since file system information and picture pointers are simultaneously recorded in the same block while the AV data is recorded without the flash memory 4 being accessed only to record the file system information (AD) and picture pointers, it is possible to record file system information and picture pointers that are frequently updated with small amounts of updated data while maintaining the access performance (i.e., the bit rate for recording and playing back AV data) of the flash memory 4.

The AD of the AV data in every block and the AD of the PP pages are recorded in the key FS and current FS. In the example shown in FIG. 10, the AD of the AV data inside the blocks b1 to b6 and the AD of the PP page inside the block b4 (that is, location information of the picture pointers of the AV data inside the blocks b1 to b4) are recorded in the key FS and the AD of the AV data inside the blocks b7 to b9 and the AD of the PP pages inside the blocks b8 and b9 (that is, location information of the picture pointers of the AV data inside the blocks b5 to b9) are recorded in the current FS.

Accordingly, the AD of all of the recorded AV data can be obtained and the AD of the PP page in which the picture pointers of all of the recorded AV data are recorded can be obtained by merely reading the key FS page(s) and the current FS page. In particular, since access to the flash memory 4 is seekless, it is possible to instantaneously obtain the AD and picture pointers from such distributed plurality of pages. Thus, it is possible to manage the file system information and picture pointers of the source files and bridge file while maintaining the access performance of the flash memory 4.

SECOND EXAMPLE

Figure 11:
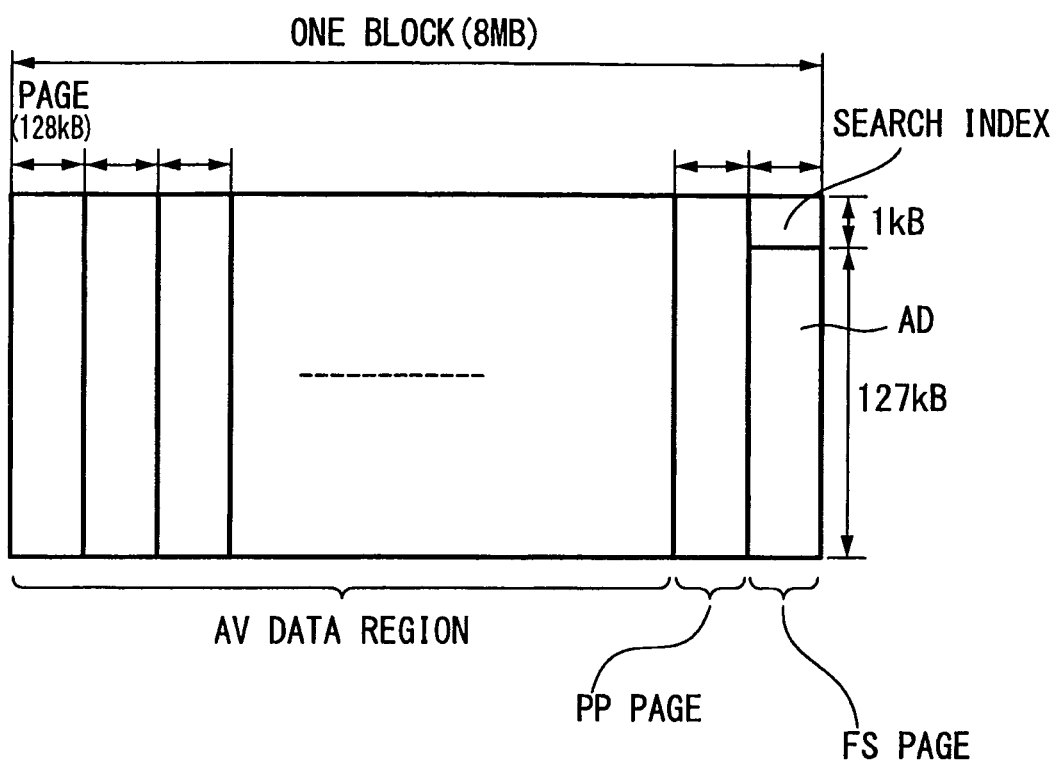
FIG. 11 is a diagram showing another example of how recording regions for file system information are assigned when recording source files and a bridge file in the flash memory shown in FIG. 1.

Next, a second example of recording processing for recording file system information of source files and a bridge file will be described. When the CPU 8 (see FIG. 1) records the source files and the bridge file in the flash memory 4, blocks are used as clusters, i.e., the units of recording regions. As shown in FIG. 11, in each block, one page is assigned as an FS page that is a region for file system information (AD) and one page is assigned as a PP page that is a region for the picture pointers (address information and size information of each frame) (the processing up to this point is the same as in FIG. 8).

In each FS page, a 1 KB region is used as a region for recording addresses of FS pages that have already been filled as a search index, and the remaining 127 KB region is used as an AD region. Note that this case where the search index region is 1 KB in size is merely one example, and since the number of FS pages that become filled will increase as the data size of the AV data increases, the number of bytes in the search index region should be decided in accordance with the data size of the AV data so that the address of every filled FS page can be recorded.

Figure 12:
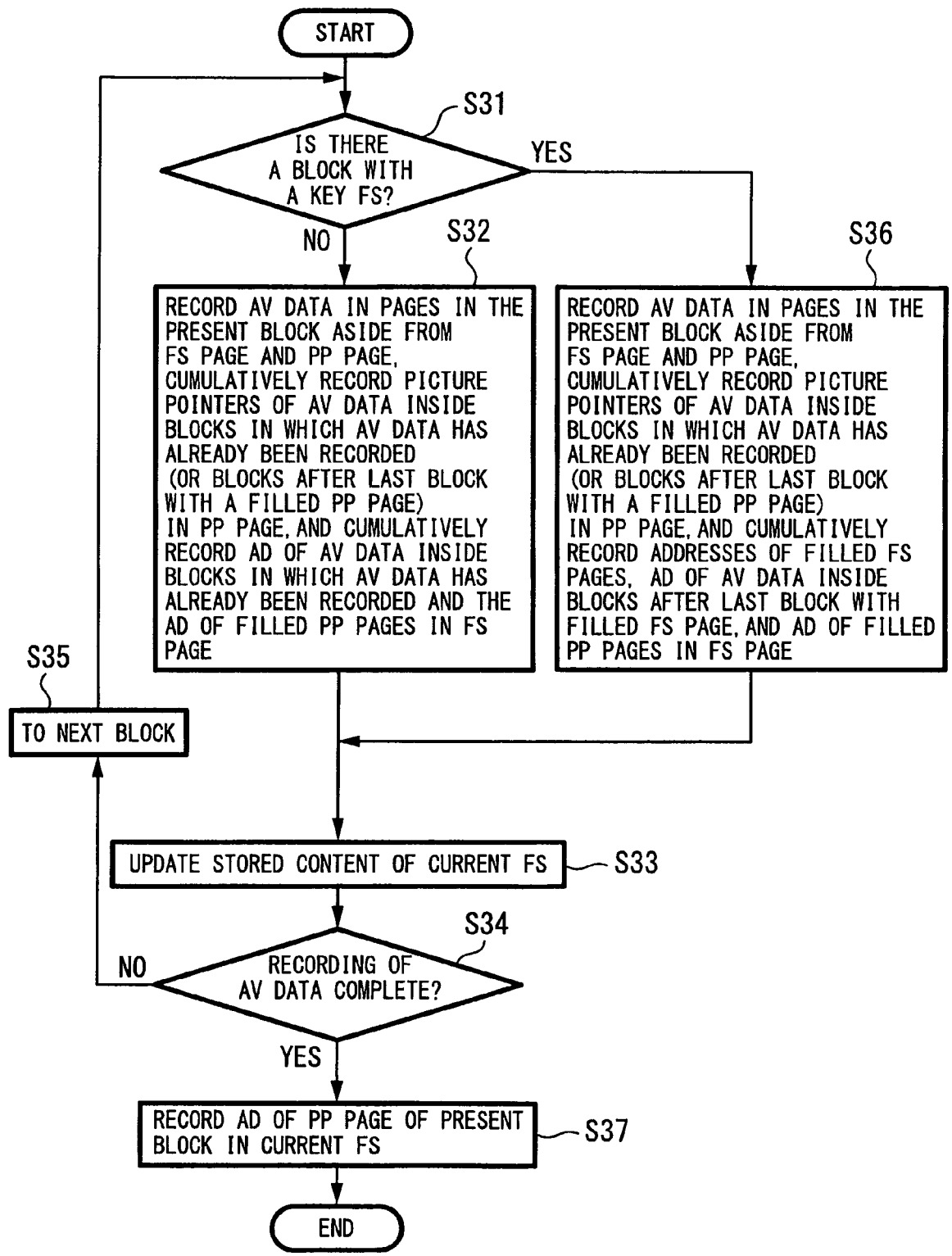
FIG. 12 is a flowchart showing another example of recording processing for AV data and file system information of source files and a bridge file.

When recording AV data of the source files and the bridge file, the CPU 8 carries out recording processing for AV data and file system information such as that shown in FIG. 12 using the file system and file manager described earlier.

In this processing, first, before AV data is recorded in the present block, it is determined whether AV data has already been recorded in a block of which FS page has been filled (step S31).

If the outcome is "no", AV data is recorded in pages in the present block other than the FS page and the PP page, and picture pointers of the AV data inside the blocks (including the present block) in which AV data has already been recorded (in a case where one or more PP pages that have been filled are present, the picture pointers of AV data inside blocks following the last filled PP page) are cumulatively recorded in the PP page. Then, the AD of AV data inside blocks (including the present block) in which AV data has already been recorded and the AD of filled PP pages are cumulatively recorded in the AD region of the FS page (step S32).

Next, in the memory inside the CPU 8, the stored content of a "current FS address" that shows the latest FS page is updated to the address of the FS page in the present block (step S33).

Next, it is determined whether the recording of all of the AV data has been completed (step S34). If the outcome is "no", the processing proceeds to the next block to be recorded (step S35) and then returns to step S31.

If the outcome is "yes" in step S31, AV data is recorded in pages in the present block other than the FS page and the PP page, and picture pointers of the AV data inside the blocks (including the present block) in which AV data has already been recorded (or in a case where one or more filled PP pages is already present, the picture pointers of AV data inside blocks following the last filled PP page) are cumulatively recorded in the PP page. Then, the addresses of every filled FS page are recorded in the search index region in the FS page, and the AD of AV data inside blocks (including the present block) subsequent to the block that includes the last filled FS page and the AD of filled PP pages are cumulatively recorded in the AD region in the FS page (step S36), before the processing proceeds to step S33.

If the outcome is "yes" in step S34, the AD of the PP page of the present block is also recorded in the FS page set as the current FS (step S37) and the processing is completed.

Figure 13:
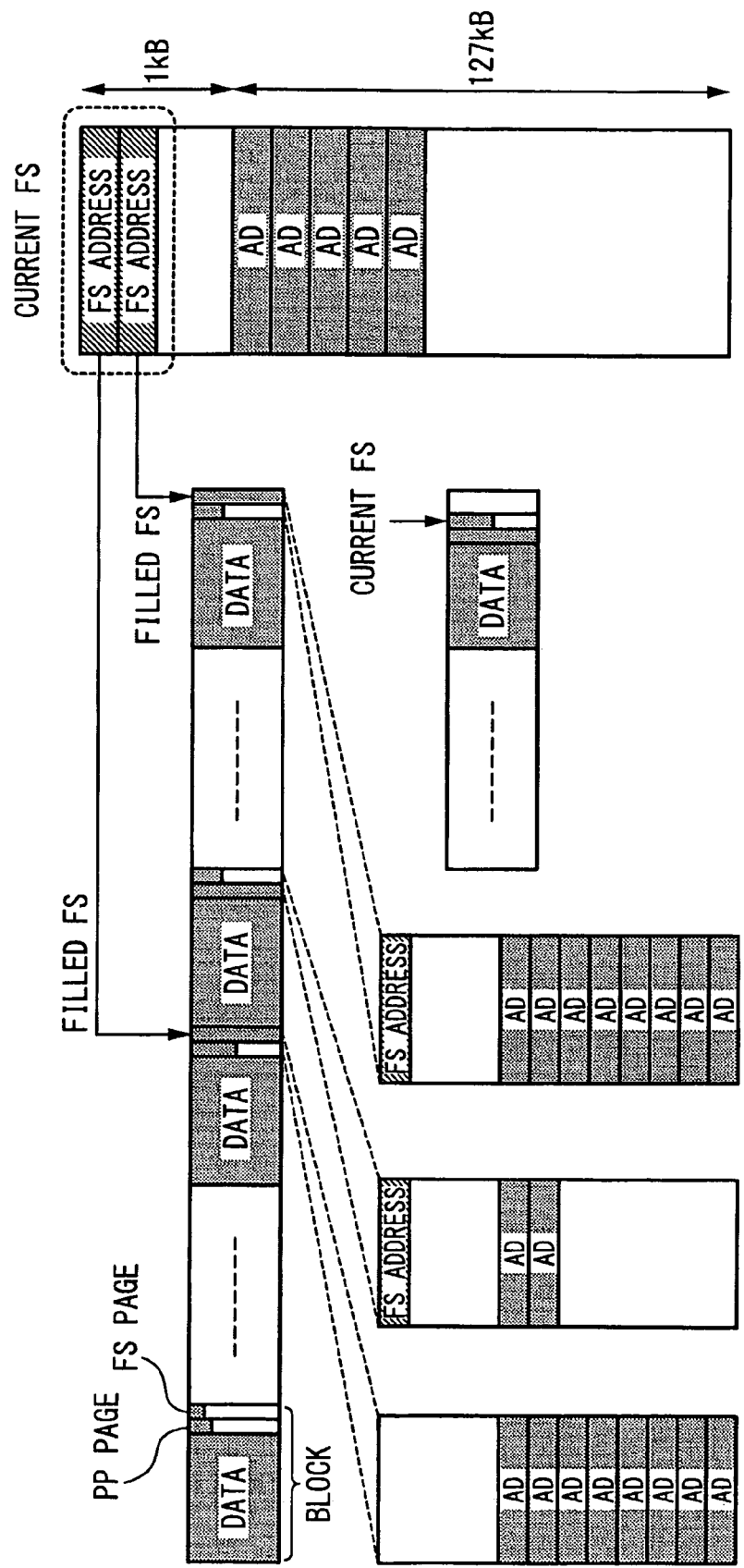
FIG. 13 is a diagram showing another example of how AV data and file system information of source files and a bridge file are recorded.

FIG. 13 is a diagram showing how AV data and file system information are recorded by the processing in FIG. 12. The addresses of every filled FS page (indicated as "FS address" in FIG. 13) are recorded in the search index region in the current FS. In the same way as the FS page of block b9 shown in FIG. 10, the AD of the AV data inside every block after a block that includes the last filled FS page, the AD of filled PP pages, and the AD of the PP page of the present block are recorded in the AD region of the current FS.

According to this recording processing, since file system information and picture pointers are recorded in the same block and at the same time as the AV data is recorded without the flash memory 4 being accessed just to record the file system information (AD) and picture pointers, it is possible to record file system information and picture pointers that are frequently updated with small amounts of updated data while maintaining the access performance (i.e., the bit rate for recording and playing back AV data) of the flash memory 4. This is the same as for the recording processing in the first example.

In addition, as shown in FIG. 13, since the address of every filled FS page is recorded in the search index region of the current FS, by reading the current FS page and then reading a filled FS page of which address is stored in the search index region, it is possible to obtain the AD of all of the recorded AV data and the AD of the PP pages in which picture pointers of all the recorded AV data are recorded.

Specifically, unlike the recording processing in the first example where recording the addresses of the key FS and the address of the current FS results in the number of pages in which the addresses are stored being indeterminate (i.e., as the amount of AV data increases, the number of filled FS pages increases, resulting in a large number of key FS), with the present recording processing it is sufficient to store the address of only one current FS. Thus, it is possible to manage the file system information and the picture pointers of the source files and the bridge file more easily while maintaining the access performance of the flash memory 4.

In the first and second examples, the case where the source files and the bridge file are recorded in the flash memory 4 is described. However, the present invention is not limited to this case and when the source files and the bridge file are recorded in the optical disc drive 5 (see FIG. 1), processing such as that shown in FIG. 9 or 12 may be carried out with parts of each recording region (i.e., cluster) on the optical disc being assigned as regions for the file system information and the picture pointers, respectively. In a recording system such as a video server equipped with a hard disk drive as main storage, processing such as that shown in FIG. 9 or 12 may be carried out with parts of each recording region (i.e., cluster) of the hard disk drive being assigned as regions for the file system information and the picture pointers, respectively.

However, since optical disc drives or hard disk drives differ to flash memory in that seek operations are time-consuming, if the file system information and the picture pointers are distributed and recorded by the processing in FIG. 9 or 12, it will take time to read out such information. Accordingly, if an embodiment of the present invention is applied to an optical disc drive or a hard disk drive, at system startup the file system information and picture pointers recorded on the optical disc drive or hard disk drive can be loaded as backup data into a device such as the memory inside the CPU 8 where seek time is not an overload and reads of the file system information and picture pointers can be carried out thereafter using such device, thereby increasing the reliability of the system.

Recording Processing for File System Information of Editing Result File

Next, an example of recording processing for file system information of an editing result file (i.e., the AD of the editing result file C shown in FIG. 4) by the video server shown in FIG. 1 will be described.

In the cut edit processing shown in FIG. 2, the editing result file C in which AD (location information) indicating the recording positions of the parts from the IN point to the OUT point of the source files (files A, B) and the recording positions of the entire bridge file are set as file system information is generated (step S5). However, the determination as to whether new AD would be generated as the AD of the editing result file C or whether the AD (see FIG. 4) of the source files and the bridge file that have already been generated would be used (without AD being newly generated) is not mentioned in the cut edit processing described above.

First, consider the case where the recording processing for AV data and file system information shown in FIGS. 8 to 10 or FIGS. 11 to 13 has been carried out for the source files and the bridge file and the AD of the source files and the bridge file are used without modification as the AD of the editing result file C.

Figure 14:
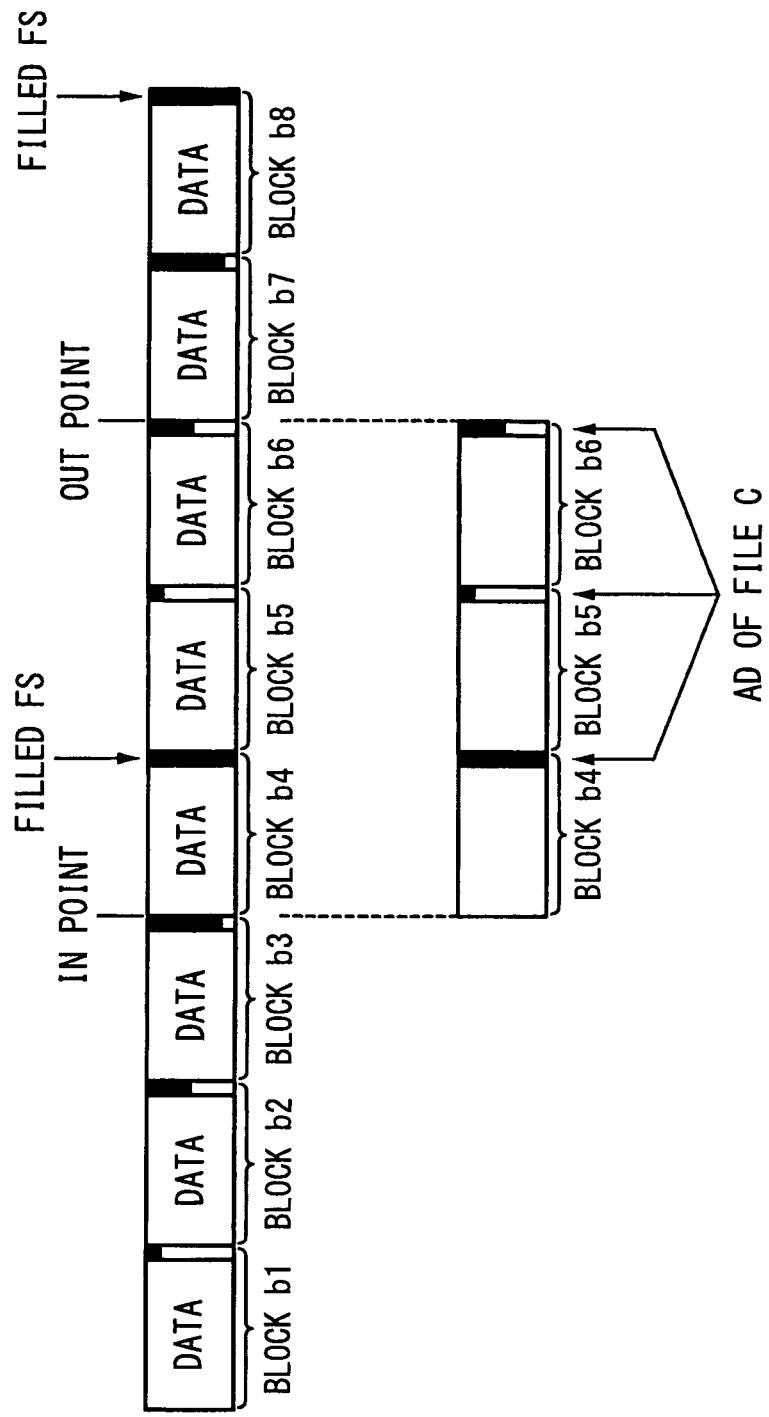
FIG. 14 is a diagram showing one example where the AD of the source files are used without modification as the AD of an editing result file C.

FIG. 14 is a diagram showing a case where AV data from the IN point to the OUT point of file A shown in FIG. 3B is recorded in the block b4 in which a filled FS page is present and the two blocks b5, b6 following thereafter of the blocks in the flash memory 4 as shown in FIG. 10 or FIG. 13, and shows the case where the AD of the file A is used without modification as the AD of the editing result file C (note that the PP pages are not shown in FIG. 14). In this case, the AD of file A recorded in the FS page of blocks b4 to b6 are used as the AD of the editing result file.

Here, although AD of only AV data inside the blocks b5, b6 that correspond to the editing result (i.e., the range from the IN point to the OUT point) of the file A are recorded in the FS pages of blocks b5, b6, both AD of the AV data inside the block b4 that corresponds to the editing result and AD of the AV data inside the blocks b1 to b3 that do not correspond to the editing result are recorded in the FS page of block b4. Accordingly, file system information that shows only the recording positions of the AV data inside the block b4 that corresponds to the editing result does not exist.

To prevent the above-described situation, it is preferable to newly generate file system information (AD) for the entire editing result file C. However, since the AV data of the source files and the bridge file are used "as such" in the editing result file C without copying the actual AV data (i.e., such files are managed via the number of accesses to clusters as shown in FIG. 5), it may not be possible for the processing carried out as shown in FIGS. 8 to 10 or FIGS. 11 to 13 to record file system information for the source files and the bridge file.

Figure 15:
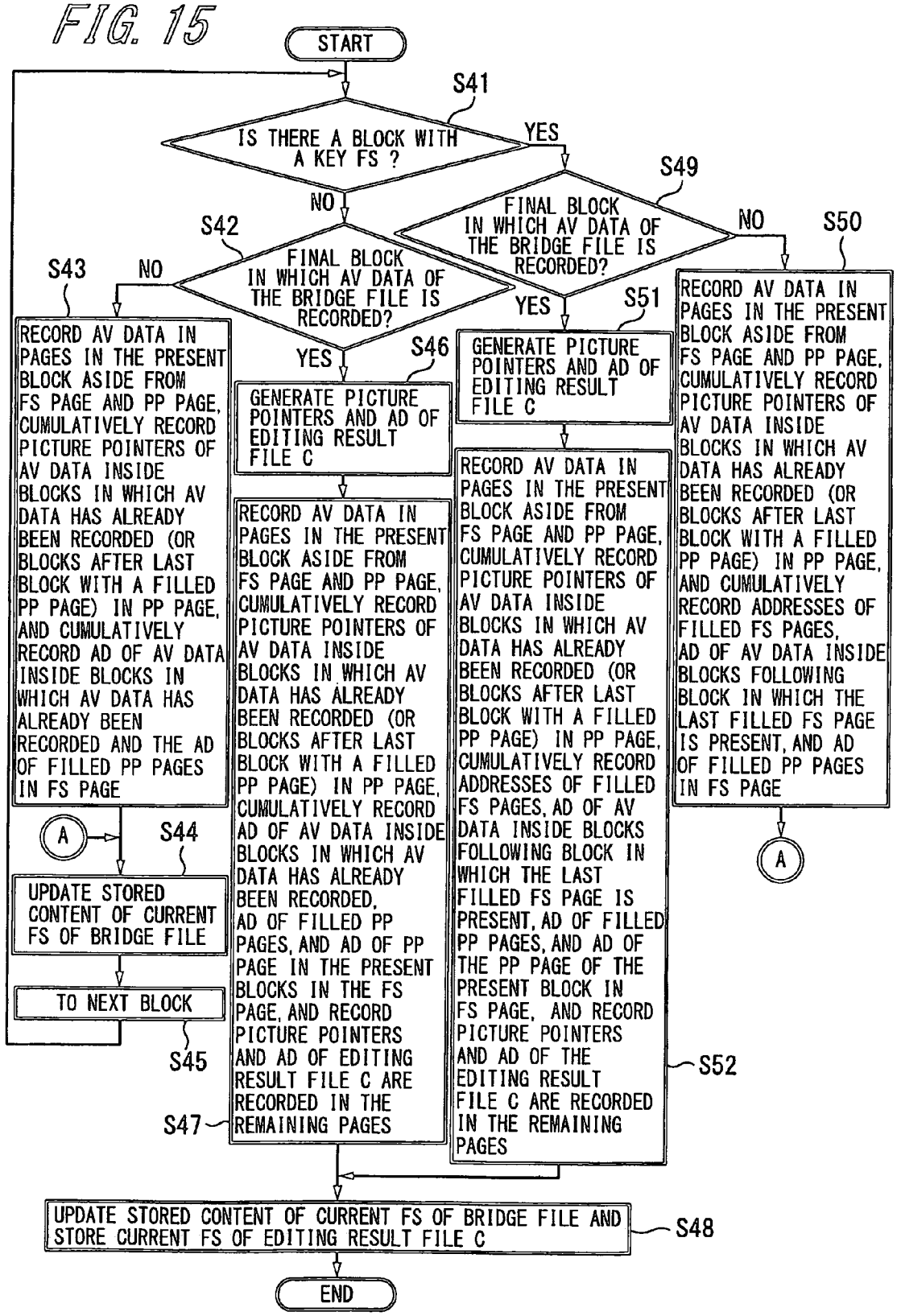
FIG. 15 is a flowchart showing one example of recording processing for AV data and file system information of source files and a bridge file and file system information of an editing result file.

Accordingly, a method of newly generating the file system information for the editing result file C and recording such file system information for the editing result file C when recording the bridge file will now be described. FIG. 15 is a flowchart showing one example of recording processing carried out by the CPU 8 to generate and record such file system information, where part of the recording processing shown in FIG. 12 is modified and the order of steps S5 and S7 of the cut edit processing shown in FIG. 2 is changed so that such steps are carried out at the same time as step S4.

In this processing, first, before AV data is recorded in the present block, it is determined whether AV data has already been recorded in a block of which FS page has been filled (step S41).

If the outcome is "no", it is determined whether the present block is the final block in which the AV data of the bridge file is recorded (step S42).

If the outcome is "no", AV data is recorded in pages in the present block other than the FS page and PP page (see FIG. 11), picture pointers of the AV data inside the blocks (including the present block) in which AV data has already been recorded (in a case where one or more PP pages that have been filled due to 128 KB of picture pointers having already been recorded are present, the picture pointers of AV data inside blocks subsequent to the last filled PP page) are cumulatively recorded in the PP page, and the AD of AV data inside blocks (including the present block) in which AV data has already been recorded and the AD of filled PP pages are cumulatively recorded in the AD region of the FS page (see FIG. 11) (step S43).

Next, the stored content of the "current FS address" for the bridge file in the memory inside the CPU 8 is updated to the address of the FS page of the present block (step S44), the processing proceeds to the next block to be recorded (step S45) and then returns to step S41.

If the outcome is "yes" in step S42, picture pointers for the editing result file C are generated (this corresponds to step S7 in FIG. 2) and as described earlier, file system information (AD) for the entire editing result file C is newly generated (step S46).

After this, AV data is recorded in pages in the present block other than the FS page and the PP page, and picture pointers of the AV data inside the blocks (including the present block) in which AV data has already been recorded (in a case where one or more PP pages that have been filled due to 128 KB of picture pointers having already been recorded are present, and the picture pointers of AV data inside blocks subsequent to the last filled PP page) are cumulatively recorded in the PP page. Then, the AD of AV data inside blocks (including the present block) in which AV data has already been recorded and the AD of filled PP pages are cumulatively recorded with the AD of the PP page in the present block in the AD region of the FS page, and the picture pointers and AD of the editing result file C are recorded in the remaining pages (i.e., pages other than the FS page and PP page in which AV data has not been recorded) (step S47).

Figure 16:
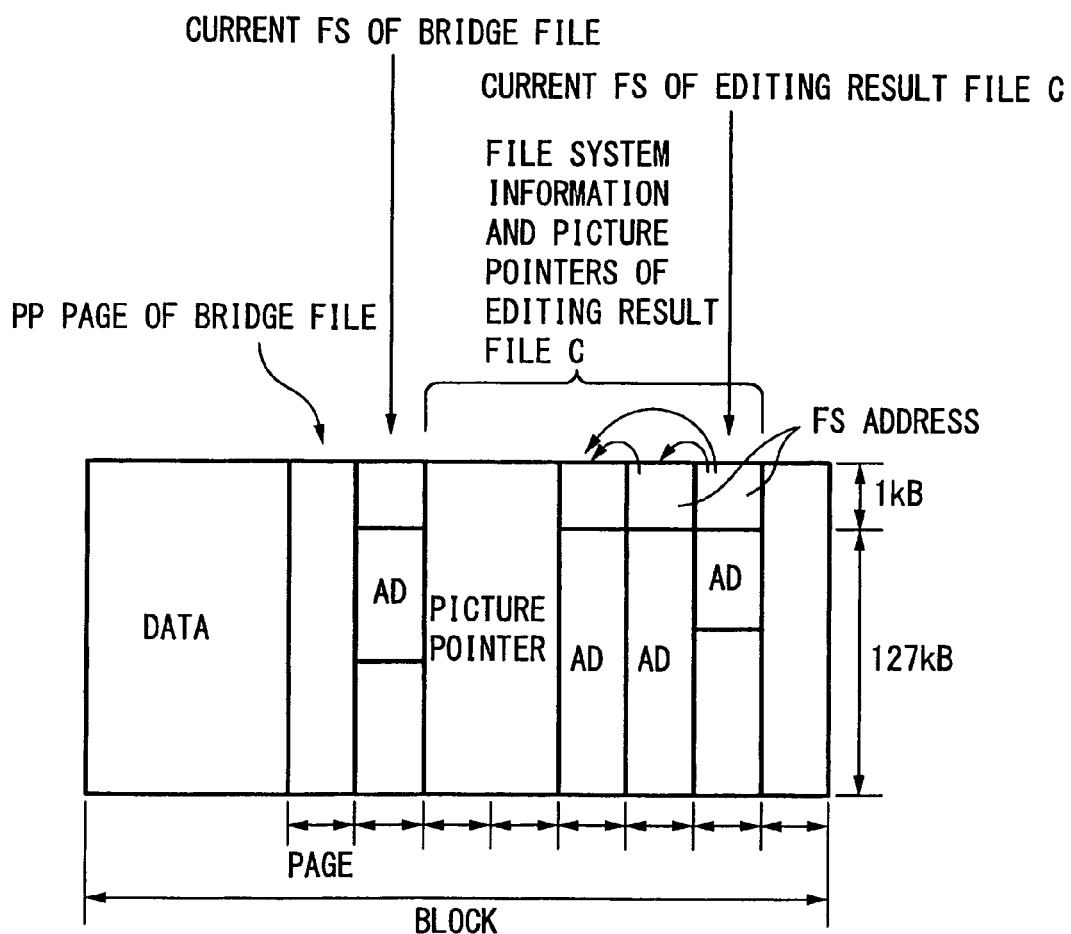
FIG. 16 is a diagram showing a method of recording file system information of the editing result file in a final block of the bridge file.

The AD of the editing result file C is recorded in step S47 according to a method such as that shown in FIG. 16. That is, for pages other than pages in which the picture pointers of the editing result file C have been recorded, in the same manner as the FS page shown in FIG. 11, a 1 KB region, for example, is set as a region for recording the addresses of filled pages as a search index and the remaining 127 KB region is set as an AD region.

Next, in addition to recording the AD of the editing result file C and the AD of the page in which the picture pointers are recorded in the AD region, the addresses of every page in which AD have already been recorded are recorded in the search index. FIG. 16 shows the state where the AD of the editing result file C have been recorded in three pages and of such three pages, the address of the left page is recorded in the search index region of the center page, and the address of the left page and the address of the center page are recorded in the search index region of the right page (such addresses are indicated as "FS addresses" in FIG. 16).

As shown in FIG. 15, after step S47, the stored content of the "current FS address" for the bridge file in the memory inside the CPU 8 is updated to the address of the FS page of the present block and the address of the page in which the AD of the editing result file C are finally recorded in step S47 is stored in the memory inside the CPU 8 as the "current FS address" of the editing result file C (step S48). After this, the processing is completed.

In the example in FIG. 16, in step S48, the address of the right page of the three pages in which the AD of the editing result file C have been recorded is stored as the "current FS address" of the editing result file C.

When, instead of a "yes" in step S42, the outcome in step S41 is "yes", it is determined whether the present block is the final block in which the AV data of the bridge file is recorded (step S49).

If the outcome is "no", AV data is recorded in pages in the present block other than the FS page and the PP page, and picture pointers of the AV data inside the blocks (including the present block) in which AV data has already been recorded (in a case where one or more PP pages that have been filled are present, and the picture pointers of AV data inside blocks subsequent to the last filled PP page) are cumulatively recorded in the PP page. Then, the addresses of every FS page that has been filled are recorded in the search index region in the FS page, and the AD of AV data inside blocks (including the present block) subsequent to the block in which the last filled FS page is present and the AD of filled PP pages are cumulatively recorded together with the AD of the PP page of the present block in the AD region in the FS page (step S50), before the processing proceeds to step S44.

If the outcome in step S49 is "yes", picture pointers of the editing result file C are generated (corresponding to step S8 in FIG. 2) and the AD of the entire editing result file C are newly generated as described earlier (step S51).

Next, AV data is recorded in pages in the present block other than the FS page and the PP page, and picture pointers of the AV data inside the blocks (including the present block) in which AV data has already been recorded (in a case where one or more PP pages that have been filled are present, the picture pointers of AV data inside blocks subsequent to the last filled PP page) are cumulatively recorded in the PP page. Then, the addresses of every FS page that has been filled are recorded in the search index in the FS page, the AD of AV data inside blocks (including the present block) subsequent to the block in which the last filled FS page is present and the AD of filled PP pages are cumulatively recorded together with the AD of the PP page of the present block in the AD region in the FS page, and, as shown in FIG. 16, the picture pointers and AD of the editing result file C are recorded in the remaining pages (i.e., pages other than the FS page and PP page in which AV data has not been recorded) (step S52). After this, the processing proceeds to step S48.

According to this recording processing, the AD and the picture pointers of the editing result file C are recorded in the final block in which the bridge file is recorded during the recording of the AV data of the bridge file without the flash memory 4 being accessed just to record the file system information (AD) and picture pointers of the editing result file C. This means that it is possible to record the file system information and the picture pointers of the editing result file C while maintaining the access performance (i.e., the bit rate for recording and playing back AV data) of the flash memory 4 and without excessively using space in the main storage.

Also, as shown in FIG. 16, by reading the current FS page of the editing result file C and then reading the page in the search index region of the current FS page in which addresses are stored, it is possible to obtain all of the AD of the editing result file C and to obtain the AD of the page in which all of the picture pointers of the editing result file C are recorded. Thus, it is possible to easily manage the file system information and the picture pointers of the editing result file C while maintaining the access performance of the flash memory 4.

Note that in the embodiment described above, an embodiment of the present invention is applied to a video server with an editing function. However, the cut edit processing and recording processing described above can also be applied to editing apparatuses other than a video server. The recording processing for AV data and file system information described using FIGS. 8 to 10 and FIGS. 11 to 13 can also be applied to recording AV data and file system information in a recording apparatus that does not have an editing function.

It should be understood by those skilled in the art that various modifications, combinations, sub-combinations and alterations may occur depending on design requirements and other factors insofar as they are within the scope of the appended claims or the equivalents thereof.

What is claimed is:

1. A recording apparatus for recording data on a recording medium having at least one recording unit, each recording unit including a plurality of blocks, comprising:

assigning means for assigning a region, in each block of the plurality of blocks utilized for one recording unit of the recording medium, as a file system information region utilized as a region for file system information for managing the data on the recording medium and for assigning a remaining region in each block as a data recording region for recording data; and recording means (a) operable to cumulatively record file system information, for data that has already been recorded in all previous blocks and a current block, in the file system information region of the current block until the file system information region in the current block is filled, and (b) operable to cumulatively record file system information, for data in all blocks subsequent to the block having the filled file system information region, in the file system information region of each subsequent block thereafter, wherein the file system information and data are simultaneously recorded in a same block.

2. A recording apparatus according to claim 1, wherein the assigning means assigns part of the file system information region as an index region for recording addresses of filled file system information regions, and the recording means records file system information for data that has been recorded in all blocks in a region other than the index region of the file system information region of each block until the file system information region in a block is filled, and records addresses of all filled file system information regions in the index region of the file system information region in each subsequent block after the file system information region in a block is filled.

3. A recording apparatus according to claim 2, wherein the recording means records file system information of data in all the block after the block having a filled file system information region, and records an address of the file system information region of a last block in which data has been recorded in a region in the file system information region other than the index region.

4. A recording apparatus according to claim 1, wherein the recording means records an address of each filled file system information region and an address of the file system information region of a last block in which data has been recorded.

5. A recording apparatus according to claim 1, wherein the recording medium is a flash memory, and the assigning means assigns one page of 64 pages that forms a block to the file system information region.

6. A method for recording data on a recording medium having at least one recording unit, each recording unit including a plurality of blocks, comprising:

an assigning step for assigning a region, in each block of the plurality of blocks utilized for one recording unit of the recording medium, as a file system information region utilized for a region for file system information for managing the data on the recording medium and for assigning a remaining region in each block as a data recording region for recording data; and a recording step (a) cumulatively recording file system information, for data that has already been recorded in all previous blocks and a current block, in the file system information region of the current block until the file system information region in the current block is filled, and (b) cumulatively recording file system information, for data in all blocks subsequent to the block having the filled file system information region, in the file system information region of each subsequent block thereafter, wherein the file system information and data are simultaneously recorded in a same block.

7. A recording apparatus for recording data on a recording medium having at least one recording unit, each recording unit including a plurality of blocks, comprising:

an assigning section assigning a region, in each block of the plurality of blocks utilized for one recording unit of the recording medium, as a file system information region utilized as a region for file system information for managing the data on the recording medium and assigning a remaining region in each block as a data recording region for recording data; and a recording section (a) operable to cumulatively record file system information, for data that has already been recorded in all previous blocks and a current block, in the file system information region of the current block until the file system information region in the current block is filled, and (b) operable to cumulatively record file system information, for data in all blocks subsequent to the block having the filled file system information region, in the file system information region of each subsequent block thereafter, wherein the file system information and data are simultaneously recorded in a same block.

* * * * *